United States Patent Office 3,128,163
Patented Apr. 7, 1964

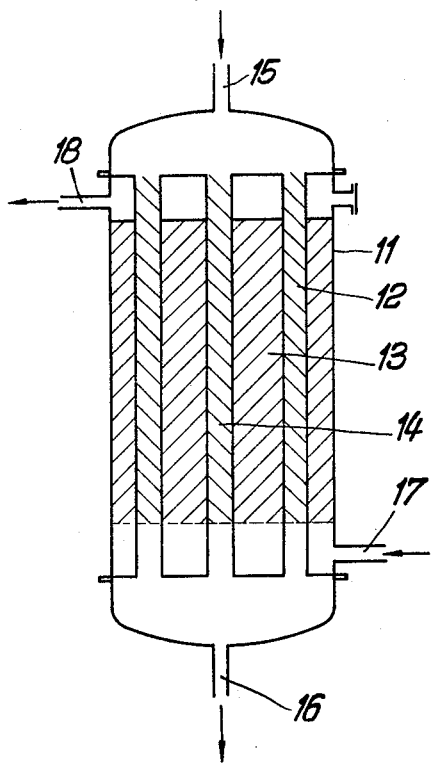

3,128,163
METHOD OF CARRYING OUT EXOTHERMIC CATALYTIC CARBON MONOXIDE-STEAM GAS REACTIONS
Hellmuth Weittenhiller, Essen-Bredeney, Franz Bieger, Dorsten, and Harry Schöfl, Essen-Margarethenhohe, Germany, assignors to Metallgesellschaft Aktiengesellschaft, Frankfurt am Main, Germany, and Steinkohlengas Aktiengesellschaft, Dorsten, Germany, both corporations of Germany
Filed May 18, 1961, Ser. No. 110,908
Claims priority, application Germany May 21, 1960
9 Claims. (Cl. 48—197)

The invention relates to a process by which exothermic catalytic gas reactions may be performed in a safe and economical manner. More particularly, the invention relates to a process for controlling exothermic gas reactions by combination therewith of an endothermic gas reaction.

It is old in the art of exothermic catalytic gas reactions as, for example, in the conversion of carbon monoxide, methane synthesis or hydrogenation of hydrocarbons, in which the gas phase to be treated is preheated to reaction temperature and passed through the reactor, to prevent any detrimental increase in temperature from taking place in the reactor by conducting off from the reactor the surplus reaction heat. This is effected either by indirect cooling of the catalyst or of the gas contained therein or the gas-steam mixture by means of cooling coils built into the reactor itself, or by exposure to cooled reactant or quenching materials. It is also known to divide the catalyst into layers or zones and to introduce intermediate the layers or zones a gas having a suitably low temperature as, for example, a gas participating in the reaction and possibly one containing hydrocarbons, or by introducing intermediate the layers or zones water vapor or, alternatively, by spraying water directly between the layers or zones. The preheating of the gas or gas-steam conversion mixture flowing into the reactor to reaction temperature is carried out by indirect heat exchange as, for example, by means of electric heaters or by utilizing the heat of the participants in the reaction or of a part thereof withdrawn from the reactor.

The use of cooling coils has the disadvantage that the temperature control is not even unless the catalyst zones are kept to a minimum size, which is not economically desirable.

The media heretofore employed for controlling exothermic and particularly rapid exothermic reactions, and which were introduced into the catalyst zones in order to reduce the temperature, had the disadvantage that they exerted a detrimental effect on the catalyst with resulting uneconomical losses.

A specific object of the present invention is to apply a temperature control method for exothermic catalytic gas reactions, avoiding the disadvantages of the prior methods.

Another object of the invention to to provide a temperature control method avoiding the difficulties of control previously mentioned and furnishing a degree of flexibility and safety, together with longer catalyst life than obtainable heretofore.

Still a further object of the invention is to provide a temperature control method giving satisfactory conversion and yields in a simple and inexpensive manner.

The foregoing and further objects will appear as the description proceeds.

It has now been ascertained in accordance with the invention that satisfactory conversion and high yields can be obtained in exothermic catalytic gas reactions by a combined process wherein an exothermic and an endothermic reaction are carried out simultaneously, the temperature of the combined process being controlled by direct or indirect heat exchange between exothermic and endothermic reactions.

More specifically in accordance with the invention, a combined process is taught in which temperature control of an exothermic catalytic gas reaction is achieved by combination therewith of a simultaneously executed endothermic gas reaction as, for example, by combination of a carbon monoxide steam-gas reaction with an endothermic cracking reaction, the temperature of the exothermic reaction being held within the desired range by means of direct or indirect heat exchange with the endothermic reaction.

In carrying out the process of the invention, the gas to be treated consists of a conversion gas in admixture with a gas to be hydrogenated, cracked or evaporated. The latter gas consists chiefly of hydrocarbons and other organic compounds as, for example, paraffins, naphthenes, aromatic substances or mixtures thereof and, in addition, possibly contains olefins, alcohols, phenols, sulfur and nitrogen compounds which are completely or partially hydrogenated during the reaction so that, in addition to saturated hydrocarbons, water, hydrogen sulfide and ammonia are produced. The paraffinic hydrocarbons can at the same time be split up into smaller size molecules if the temperature of the gas reaction is chosen sufficiently high.

The addition of the hydrocarbons or gas containing the same can be effected in various ways. For example, the starting reaction gas can consist of a reaction gas containing in admixture a predetermined proportion of hydrocarbon vapors obtained, for instance, by complete vaporization of the hydrocarbons into the gas stream at a temperature lower than the reaction temperature for the exothermic water gas reaction and the gas mixture formed thereafter heated to the reaction temperature. The preheated gas mixture then enters into the first catalyst zone wherein the hydrocarbons are, for example, hydrogenated, the heat produced during the hydrogenation being utilized for bringing the catalyst for the exothermic reaction to a higher temperature. The catalyst which is used for the hydrogenation is any of the well-known catalysts containing nickel, cobalt, iron, molybdenum, tungsten, platinum or other hydrogenating metal or a mixture thereof. The quantity of heat liberated during the hydrogenation can be controlled either by regulation of the quantity of hydrocarbon added per $Nm.^3$ reaction gas or by the proportion of hydrogenatable compounds contained in the hydrocarbon-containing gas or by a combination of both measures.

If the reaction mixture enters the first catalyst zone at a temperature of, for example, 300 to 400° C., as is required for the conversion of carbon monoxide into carbonic acid and hydrogen by means of steam, so much heat is generated by the conversion reaction that the gas is further heated and the subsequently arranged catalyst layers are thereby extensively heated up. Hydrocarbons which have been added to the gas stream, and especially paraffin hydrocarbons, are now substantially split up or are partially split into smaller size molecules which undergo partial hydrogenation whereby the liberated heat is consumed and, as a result, the catalyst zone is cooled. If this heat consumption is not sufficient to cool the catalyst to the desired temperature, further hydrocarbon is introduced either in the form of vapor or by spraying, preferably in liquid form, intermediate the first and second or the second and third catalyst layers, etc. Through the vaporization taking place in the hydrogenating catalytic carbon reformation—i.e., splitting and isomerization of the paraffin hydrocarbons as well as dehydrogenation (endothermic) of the naphthenes, which sets in at the same time, the temperature of the reaction mixture is considerably reduced. This effect can, if necessary, be enhanced with heat exchangers.

During the conversion of the carbon monoxide, a quantity of heat amounting to about 400 kcal. per $Nm.^3$ of converted carbon monoxide is liberated which, for example in the case of the conversion of water gas containing 40% CO and the usual quantity of water vapor, results in an increase in temperature of the reaction mixture of about 150° C. The corresponding temperature of the catalyst is about 350° C.; consequently, the temperature then rises to about 500° C. To obtain an extensive carbon monoxide conversion with the smallest possible addition of live steam, it is necessary for reasons of equilibrium to terminate the carbon monoxide conversion at the lowest possible temperature, i.e., at about 380 to 400° C. As has already been suggested for this purpose, the carbon monoxide conversion reaction is usually carried out in a multi-stage operation—i.e., in two or even three stages, the gas being cooled to about 380° C. after the first catayslt stage. The cooling has heretofore generally been effected by indirect heat exchange (indirect cooling zones intermittent the catalyst zones) or by injecting water directly between the individual stages or zones. The heat exchange requires the additional expenditure for coils and conduits and is at best uneven. The injection of water is frequently open to objection in that the catalyst becomes encrusted with solids dissolved in the water and its activity and life period are impaired thereby, as well as that the same similarly give rise to unequal cooling.

To avoid this loss of activity of the catalyst and furthermore to simplify the apparatus by using less and smaller apparatus for the exchange of heat between the reaction products and the substantces entering the process, hydrocarbons, as, for example, light gasoline or disel oil or liquid hydrocarbons produced in gas generators or which are the products of a cracking process, are introduced, according to the invention, intermediate successive catalyst layers into the flow system for the purpose of cooling. This results in a gentle cooling of the catalyst which can be easily controlled by suitably measuring the quantities of hydrocarbons or the like actually introduced so that the catalyst is maintained at exactly the temperature which is most favorable for the reaction. The heat withdrawal or cooling takes place, on the one hand, by vaporization of the hydrocarbons and, on the other hand, by the more or less extensive hydrocarbon splitting or cracking taking place, the extent of which is dependent upon the operating temperature and the character of the materials introduced. These can be used in relatively pure state. Thus, the advantage is realized that even the most sensitive catalyst can be utilized. It is, however, likewise possible to employ hydrocarbons which have not been pre-purified and contain, for example, sulfur compounds and resinous constituents, and especially when insensitive catalysts such as sulfur-resistant hydrogenation catalyst as, for example, of the cobalt-molybdenum, are provided.

In the embodiment of the invention, when the catalysts are arranged in stages or layers, the hydrocarbons which have not been previously purified may be introduced into the first stage or zone in which a hydrogenating catalyst is provided, whereas, for the other layers or zones which are no longer endangered, a less sensitive catalyst as, for example, an iron oxide-chromium oxide catalyst can be employed.

By a more or less extensive splitting of the added hydrocarbons introduced into the reactor, the calorific value of the final gas can also be influenced in a desired manner. For example, if a gas with a high calorific value is required and the initial gas has a too low calorific value, the treatment and especially the splitting of the hydrocarbons is so conducted that large quantities of gaseous hydrocarbons having a high calorific value are formed, which brings about a corresponding increase in calorific value of the final gas. Thus, for example, it is known that hydrocarbons such as propane and butane have extremely high calorific values, i.e., approximately 2500 B.t.u per cubic foot, while the caloric value resulting from the complete conversion of a hydrocarbon or of water gas is very low (about 325 B.t.u. per cu. ft.). The gas resulting from the combined process in accordance with the invention may have a calorific value rendering it suitable for further industrial use. The process of the invention has the advantage over the known processes that, immediately on being introduced, the added substances, as, for example, the paraffinic hydrocarbons, are converted into low molecular substances by splitting, whereby a subsequent condensation of the hydrocarbons having too high a molecular weight is no longer necessary. The condensation and separation of such high molecular weight substances could not be avoided in the conventionally practiced procedures. On the other hand, however, the process according to the invention can also be carried out in the known manner, namely, with reformation of the added hydrocarbons into both lower molecular and higher molecular forms. The process according to the invention also enables with suitable development and modification of the splitting—i.e., reformation—to effect the reaction without any or with only a slight increase in the calorific value of the final gas, the latter being accomplished in that the hydrocarbons introduced are separated out, as by condensation, after passing through the reactor.

According to the process or method forming the subject matter of the invention, it is further possible to combine with the control of the temperature, by introduction of the hydrocarbons into the catalyst or catalysts, a refinement of these hydrocarbons. If, for example, hydrocarbons are introduced in relatively large quantities, and conversion is carried out at a low temperature, a refinement of the hydrocarbons then takes place, the splitting being relegated to the second or still later catalyst stage.

The process according to the invention can be carried out under normal or under increased pressure or varied in the different gas reactions as, for example, not only in the case of the conversion of the gases containing carbon monoxide but also in the case of methanization where the use of higher pressures appears to be indicated.

Furthermore, it is possible in the case of the process according to the invention to carry out a hydrogenating splitting of the hydrocarbons, an exothermic as for example carbon monoxide conversion reaction, and a hydrogenations of hydrocarbons without splitting simultaneously but, stagewise, separately in indirectly communicating reactors or in combination in the same reactor but in separate communicating reacting chambers or possibly simultaneously in the same reaction chambers. This enables the exchange of heat of all the above described exothermic and endothermic reactions and procedures according to the invention to be carried out utilizing either direct or indirect heat exchange.

Thus, for example, it is possible to carry out a reformation of gasoline to increase its octane number in an apparatus constructed in the form of a heat exchanger so that the reformation takes place in the interior of the cracking tubes containing a catalyst for cracking hydrocarbons. In the space between the cracking tubes the catalyst for the exothermic reaction—as, for example, carbon monoxide gas conversion reaction, is maintained. Alternatively, the reaction may take place in a reactor utilizing one or more vessels to provide series flow through differential reactor segments or zones intermitted by direct cooling zones—i.e., fluid inlet means being provided for admission of fluids directly between catalytic zones to provide a continuous flow system.

The use of either reaction provides a differential reactor system in contrast to operations with an integral reactor, which is the usual type wherein the entire reaction takes place in one unitary portion of the catalyst system.

According to the invention the two processes can be carried out with one type of catalyst or more than one type of catalyst, or with catalyst combinations—whichever are more particularly suitable for the specific purpose of the process.

In the instance where the two or more processes take place in indirect heat exchange contact, i.e., in stages arranged parallel and adjacent to one another in heat exchange, the reactant streams can pass in co- or counter-current flow through the separated catalyst zones, in which zones the catalysts can also be arranged in stages or layers. It is thereby also possible to effect, according to the invention, a temperature control within each reactor space or zone by splitting hydrogenation, evaporation, etc.

Furthermore, the fluid reacting streams can, according to the invention, be treated under different pressures within the individual reaction zones in heat exchange. Additionally, one of the reactions can be carried out with substances in very pure state, using highly sensitive catalysts, whereas the second reaction taking place in reaction zones out of contact with the first reaction zone can employ comparatively impure products and therefore may utilize less sensitive catalysts, for example, sulfur resistant catalysts.

As illustrative of the manner in which the invention may be realized, reference is made to the drawings forming a part of this specification and in which drawings:

FIG. 2 is a vertical section of reactor constructed as a heat exchanger.

Figure 1:
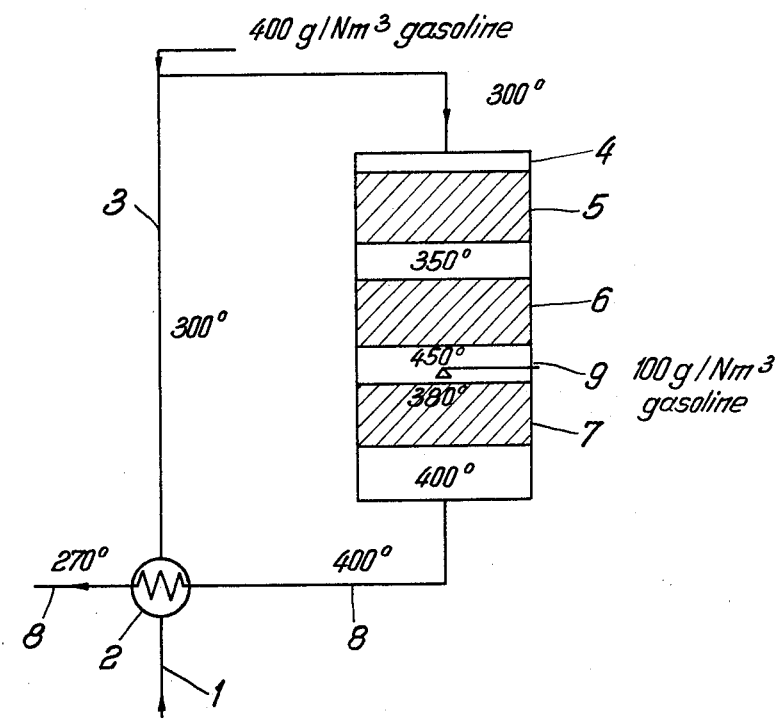
FIGURE 1 shows a flow diagram and a schematic representation of an apparatus employed in the carrying out of the invention.

In FIG. 1 impure initial gas containing about 23% carbon monoxide, 40% hydrogen and 30% carbon dioxide is utilized. The initial gas, which is composed of about 55 vol. percent hydrogen based on the dry gas, has a temperature of 170° C. and flows from the gas generator through conduit 1 into heat exchanger 2. On leaving the heat exchanger, the gas is fed at a temperature of about 300° C. through conduit 3 into reactor 4, in which the catalyst is maintained in three layers 5, 6, and 7. The converted gas flows out of the reactor at a temperature of about 400° C. and is thereafter flowed through heat exchanger 2, and thence into conduit 8 for further use. Inlet 9 serves for admitting further hydrocarbons into the space between the catalyst layers 6 and 7. Similar inlets can be provided at other points of the reactor.

In order that the invention may be clearly understood and readily carried into effect, some practical methods of carrying out the invention will now be described in somewhat greater detail by way of example.

*Example 1*

A gas having the composition above indicated is to be converted into a gas having a residual content of carbon monoxide of about 5%. The gas enters the reactor at 300° C. and is heated in the first catalyst layer 5 to a temperature of about 350° C., at which temperature the conversion reaction commences in the following layer 6 at the desired velocity. The increase in temperature is obtained by introducing into the reactor, immediately preceding the first catalyst layer 5, 400 grams of vaporized gasoline having a sulfur content of 1% per Nm.$^3$ of heated gas to be converted. The catalyst is, for example, a cobalt molybdenum catalyst of known composition. The catalyst is effective to carry out a hydrogenating refinement of the gasoline and simultaneously produce in the gas stream the desired increase in temperature for conversion of the initial gas.

In passing through the second catalyst zone 6 as well as the third zone 7 in which iron oxide, chromium oxide catalysts of known composition are provided, the reaction temperature continues to rise to 450° C. It is desirable to reduce the temperature of the reaction mixture before it enters into reaction zone 6 and/or 7. This is accomplished and the temperature of the gas is reduced to a temperature of 380° C. by adding to the gas stream intermittent zones 5 and 6, and/or 7, through line 9, 100 grams per Nm.$^3$ of a gaseous gasoline fraction having a boiling point between 40 and 200° C. The gas leaving the last reaction zone has a temperature of 400° C. at its discharge from the reactor. This slight increase in temperature results from the combined positive conversion heat and the negative heat of splitting.

The discharge gas is thereafter passed into heat exchanger 2 and directed into a subsequently arranged cooler. The cool gas is then directed into a $CO_2$ scrubber. A gas having the following composition is obtained:

|  | Before scrubbing | After $CO_2$ scrubbing |
|---|---|---|
| $CO_2$ | 40.7 | 4.5 |
| $C_nH_m$ | 4.8 | 7.7 |
| $CO$ | 5.3 | 8.6 |
| $H_2$ | 43.0 | 69.2 |
| $CH_4$ | 5.4 | 8.7 |
| $N_2$ | 0.8 | 1.3 |
|  |  | 4,600 kcal./Nm.$^3$ |

During the cooling of the gas, 320 g./Nm.$^3$ of gasoline are separated out. The separated fraction has a boiling range of 32 to 160° C. and a sulfur content of 0.2%.

*Example 2*

In the following example, a reactor, as shown in FIG. 2 and which is constructed as a tubular heat exchanger, is employed. The reactor 11 is composed of tubes 12 in which the reforming catalyst 13 is provided. In the spaces between the tubes 12, a conversion catalyst 14 is maintained. Gasoline vapors are introduced through conduit 15, and the reformed product leaves the reactor through conduit 16. The gas to be converted enters at 17, and the converted gas flows out at 18.

The $CO_2$ containing gas which is to be converted is introduced into the reactor at 17 at a temperature of 350° C. It is heated up to 450° C. in the catalyst layer or zone 13. The gas temperature is reduced prior to the discharge thereof from the reactor at 18 to 400° C. by removal of heat of conversion by indirect heat exchange with the gas stream being reformed in tubes 12. The gasoline vapors enter the reactor at 15 at a temperature of 350° C., in passing through the reforming catalyst are first heated to 430° C. and then cooled so that they leave the reforming catalyst zone at 16 at a temperature of 380° C.

The gasoline introduced has a research octane number of 72 which is increased to 90 by the reformation taking place. The gas introduced into the conversion catalyst has a carbon monoxide content of 38% which on leaving the conversion zone drops to 4.2%.

We claim:
1. A catalytic carbon monoxide-steam conversion process which comprises initially heating a stream of a carbon monoxide steam conversion gas, steam and hydrocarbon vapors to a temperature below that corresponding to the carbon monoxide steam conversion temperature, thereafter passing the initially heated stream serially through a plurality of catalytic stages at temperatures at which substantial hydrocarbon reformation and carbon monoxide-steam conversion occurs and controlling the temperatures in said catalytic stages by cooling the stream of reactants and products between successive catalytic stages by introducing into the said stream of reactants and products fluid hydrocarbons the heat created in said exothermic carbon-monoxide steam conversion reaction being transferred by direct heat exchange to the endothermic hydrocarbon gas reformation reaction taking place simultaneously in said stream.

2. A process according to claim 1 wherein said catalyst in the first of said catalytic stages is of a different composition from said catalyst in the remaining stages.

3. Process according to claim 1 which comprises controlling the amount of hydrocarbons introduced in such a manner that the temperature of the catalyst is maintained at about 380° to 400° C.

4. Process according to claim 1 wherein said hydrocarbon is a low boiling paraffinic hydrocarbon.

5. The manufacture of a reformed gas of high calorific value which comprises flowing a paraffinic hydrocarbon through a vaporizing zone and therein vaporizing the same, transferring said vapor to a circulating stream of steam and a carbon-monoxide steam conversion gas, passing said combined stream through a plurality of serial catalytic zones at temperatures at which substantial hydrocarbon reformation with production of gaseous hydrocarbons having a high calorific value and conversion occurs and controlling the temperature in said catalytic stages by transferring by direct heat exchange the heat created in said conversion reaction to said hydrocarbon reformation.

6. Process according to claim 5, which comprises utilizing heat from the conversion reaction to vaporize said hydrocarbons.

7. Process according to claim 5, wherein the hydrocarbon vapor is a gasoline fraction having a boiling point between about 40 and 200° C.

8. Process according to claim 5, whereby substantial quantities of methane are produced in said reformation.

9. A carbon monoxide steam conversion process which comprises subjecting a carbon monoxide steam conversion gas mixture to exothermic catalytic treatment in a series of stages in the presence of a carbon monoxide steam conversion catalyst, cooling the reaction mixture thereby formed intermediate catalytic stages and transferring the heat created in said exothermic conversion reaction to an endothermic catalytic hydrocarbon gas reformation reaction being simultaneously executed by introducing vapors of a hydrocarbon gas into said reaction mixture.

References Cited in the file of this patent

UNITED STATES PATENTS

| | | |
|---|---|---|
| 1,874,801 | Porter | Aug. 30, 1932 |
| 1,951,774 | Russell et al. | Mar. 20, 1934 |
| 2,440,424 | Wiegand et al. | Apr. 27, 1948 |
| 2,579,843 | Mader | Dec. 25, 1951 |
| 2,705,189 | Ekholm | Mar. 29, 1955 |
| 3,057,708 | Hilgers | Oct. 9, 1962 |

FOREIGN PATENTS

| | | |
|---|---|---|
| 1,112,998 | France | Nov. 23, 1955 |